UNITED STATES PATENT OFFICE.

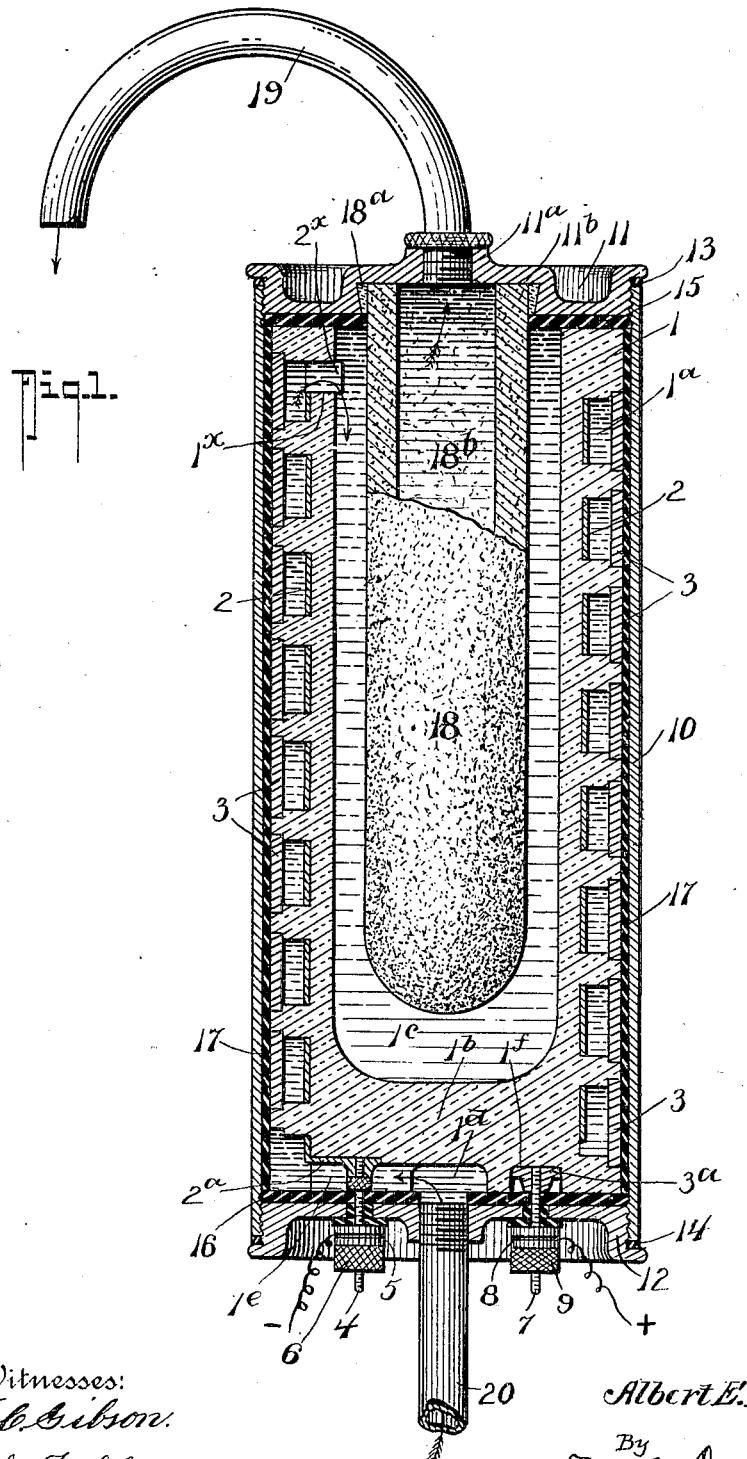

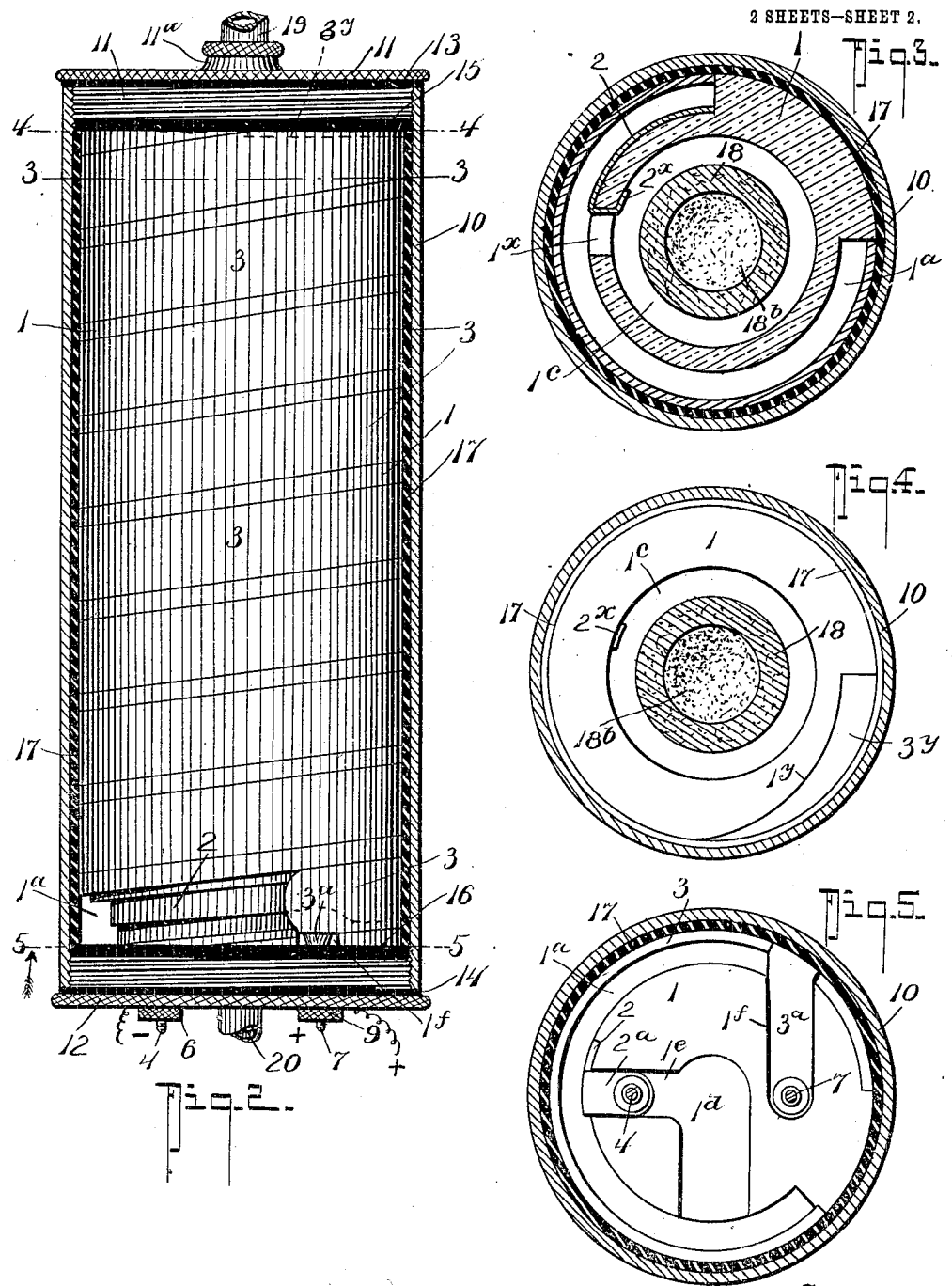

ALBERT E. DIETERICH, OF WASHINGTON, DISTRICT OF COLUMBIA.

WATER-PURIFYING APPARATUS.

No. 838,390.          Specification of Letters Patent.          Patented Dec. 11, 1906.

Application filed October 11, 1906. Serial No. 338,445.

*To all whom it may concern:*

Be it known that I, ALBERT E. DIETERICH, residing at Washington, in the District of Columbia, have invented certain new and useful Improvements in Water-Purifying Apparatus, of which the following is a specification.

My invention relates to certain new and useful improvements in water-purifying apparatus; and it particularly relates to that class of water-purifying apparatus employing electrolysis for precipitating the impurities in the water and mechanical means for filtering out the precipitated impurities.

In its generic nature my invention has for its object to provide a water-purifying apparatus of a very simple and effective construction, which can be easily and cheaply manufactured, and which will readily and effectively serve its intended purposes, and which is, furthermore, particularly adapted for household use.

In its more detailed nature my invention comprises a casing having closure-caps at each end, a core of non-conducting material which is waterproof and upon the outside of which a water-containing groove is formed, extending, preferably, in a spiral line from the bottom of the casing to a point adjacent the top thereof, the core being hollow to form a water-chamber within which a filtering-stone is suspended, through which the water must pass before it passes out of the discharge-pipe that is in communication with the interior of the filtering-stone. Within the water-passage of the core a pair of electrodes are held, and these electrodes have terminals which pass out through one of the closure-caps, by means of which they are connected to a source of electric-current supply.

In its still further detailed nature my invention also comprises certain novel construction, operation, and arrangement of parts, all of which will be first described in detail and then be specifically pointed out in the appended claims, reference being had to the accompanying drawings, in which—

Figure 1 is a central vertical sectional view of my invention, parts being shown in elevation. Fig. 2 is a view of my invention, the casing and insulation between the core and the casing being shown in longitudinal section and the core, the surrounding electrodes, and the closure-caps for the casing being shown in side elevation. Figs. 3, 4, and 5 are sections, respectively, on the lines 3 3, 4 4, and 5 5 of Fig. 2.

Referring now to the accompanying drawings, in which like numerals of reference indicate like parts in all of the figures, 1 designates a core, which is preferably constructed of porcelain, glass, or other suitable non-conducting material impervious to water and which will not be effected by the electric current. The core 1 in the form of my invention shown in the drawings is of a cylindrical shape and provided on its periphery with a deep spiral groove extending from bottom to top thereof, and within the bottom of the groove the negative electrode 2 is wound.

The electrode 2 is in the nature of a thin strip of sheet-aluminium whose lower end is bent to form a contact-strip $2^a$, into which the contact 4 is secured. The upper end of the negative electrode 2 has an ear or rivet-like portion $2^x$, which is bent through an aperture $1^x$ in the core 1, as indicated. The electrode 2 is preferably tightly wound into the spiral so that it will lie tightly against the bottom of the spiral groove. Wound preferably in the spiral groove $1^a$ of the core 1, but spaced from the electrode 2, is a second electrode 3, which forms the positive electrode and is preferably constructed of a thicker strip of aluminium than that of the electrode 2, the spiral groove 2 or channel $1^a$ being preferably shaped to receive the strip 3 and hold it in place, so that the outer surface of the strip 3 will preferably lie parallel with the outer surface of the core 1. Thus it will be seen that by reason of the formation of the spiral groove $1^a$ within the core 1 a spiral water-passage is produced from one end of the core to the other and the water is caused to pass between the electrodes 2 and 3. The core 1 is open at its upper end and has its lower end closed by a bottom $1^b$, on the bottom surface of which a groove $1^d$ is formed, which communicates with the inlet from the inlet-pipe 20, and the groove $1^d$ merges with the groove $1^e$, within which the contact $2^a$ is held. The electrode 3 has its lower end bent into a contact-strip $3^a$, which lies in the supplemental groove $1^f$ in the bottom of the core 1 and with which the contact-post 7 is connected. The upper end of the electrode 3 is bent over into an ear $3^y$, which lies in the groove $1^y$ in the top of the core 1. The electrode 3 is preferably tightly wound in the groove 2, so as to form as nearly as practicable a water seal.

Surrounding the core 1 and its electrodes I place an insulating material 17, which may be of any approved material and construction—such, for instance, as soft rubber—to from a packing, as well as to serve insulation purposes. The core 1 and its insulating-covering 17 are then placed within a tube 10 to snugly fit the same, and the tube 10 is closed at each end by screw-caps 11 and 12, insulating-washers 15 and 16 being provided for the caps 11 and 12, respectively. The contacts 4 and 7 pass through the cap 12 and are insulated therefrom, as indicated, and receive contact-washers 5 and 8, respectively, and milled nuts 6 and 9, respectively. The intake-pipe 20 communicates with the source of water-supply and is passed through a hub-like portion in the cap 12 and communicates with the groove $1^d$, as before stated. The core 1 is hollow to form a water-chamber $1^c$, with which the aperture $1^x$ at the top of the core communicates, and the cap 11 carries a hollow filter-stone 18, which is cemented or otherwise secured in the cap, as at $18^c$, and the stone 18 is hollow to form a water-chamber $18^b$, from which the water passes out through the spout 19, as indicated by the arrows in Fig. 1, it being understood that the spout 19 is carried by the cap 11 and communicates with the chamber $18^b$, as shown.

From the foregoing description it is thought the complete construction of my invention will be readily understood by those skilled in the art to which the invention appertains, and the manner in which my invention operates will be best explained as follows: The pipe 20 being connected to any suitable source of water-supply and the negative electrode 4 and the positive electrode 7 being connected, respectively, to the proper terminals of a suitable source of electric energy, the water as it enters the purifier through the pipe 20 is received in the groove $1^d$ and passes through the same and the passage $1^e$ into the spiral channel $1^a$ on the outside of the core 1.

In this channel the water passes between the electrodes 2 and 4, where it undergoes the action of the electric current, and in which channel or groove $1^a$ the electric current precipitates the impurities in the water in a manner well understood by those skilled in the art to which this invention appertains. As the water passes through the groove $1^a$ around the core 1 and reaches the aperture $1^x$ it passes through the aperture $1^x$ and is discharged with all its precipitated impurities into the chamber $1^c$, passing through the filter-stone 18 into the water-chamber $18^b$ thereof. As the water passes through the filter-stone 18 it will be relieved of all the suspended impurities, and when it passes out of the chamber $18^b$ through the spout 19 the water will be perfectly clean.

By reason of the construction of my purifying apparatus the same can be readily taken apart for cleaning purposes, since the water enters at the bottom and passes up toward the top and all impurities will pass along with the water and be discharged into the chamber $1^c$ and be collected on the stone 18 as the water passes therethrough, and hence to clean my purifier it is only necessary to unscrew the cap 11 and wash the filter-stone 18. When the electrode 3 becomes decomposed and it is desired to resupply the electrodes, it is only necessary to unscrew the cap 11, remove the same and the filter-stone, unscrew the milled nuts 6 and 9, and pull the core 1 out through the top of the casing 10, after which the old electrodes can be taken off and new ones substituted. This latter operation of changing the electrodes is only occasionally required, as when they become decomposed by electrolysis after long use.

While I have described the invention and specifically referred to the covering 17 as being an insulating and packing material, yet I desire it understood that the insulation 17 may be entirely dispensed with and the casing 10 may be made of an insulating substance, all of which and other slight changes in the detail construction and arrangement of parts may be made without departing from the spirit of the invention or that of the appended claims.

What I claim is—

1. The combination with a hollow core having a water-passage on its outer surface, of electrodes held in said water-passage, in contact with the water therein, said water-passage communicating at one end with the interior of the core and at the other end with a source of water-supply, and a mechanical filtering means within the hollow core, and a water-offtake communicating with the mechanical filtering means, substantially as shown and described.

2. The combination with a hollow core having a spiral water-passage on its periphery extending from one end to the other, a pair of electrodes wound in said water-passage and spaced apart to permit the water to pass therebetween, means for connecting said electrodes with an electric circuit, means for admitting water into said water-passage at one end, means for passing the water from the spiral water-passage at the other end into the interior of the hollow core, a filtering means projected into said hollow core, and an offtake for said filtering means, substantially as shown and described.

3. The combination with a hollow core having a spiral water-passage, from end to end, said core having a passage between the spiral water-passage and the interior of the core, means for admitting water into said spiral water-passage, means within said spiral water-passage for electrolytically treating water, a filter-stone within the hollow core through which the water passes and an offtake from the interior of said filter-stone, substantially as shown and described.

4. The combination with a hollow core having a spiral water-passage, from end to end, said core having a passage between the spiral water-passage and the interior of the core, means for admitting water into said spiral water-passage, means within said spiral water-passage for electrolytically treating said water, a filter-stone within the hollow core through which said water passes, an offtake from the interior of said filter-stone, said electrolytic treating means comprising a pair of spaced spiral electrodes wound in said spiral water-passage, substantially as shown and described.

5. The combination with a hollow core having a water-passage on its outer surface, of electrodes held in said water-passage in contact with the water therein, said water-passage communicating at one end with the interior of the core and at the other end with a source of water-supply, a mechanical filtering means within the hollow core, a water-offtake communicating with the mechanical filtering means, and a casing for the whole, substantially as shown and described.

6. The combination with a hollow core having a spiral water-passage from end to end, said core having a passage between the spiral water-passage and the interior of the core, means for admitting water into said spiral water-passage, means within said spiral water-passage for electrolytically treating said water, a filter-stone within the hollow core through which said water passes, an offtake from the interior of said filter-stone, and a casing for the whole, substantially as shown and described.

7. The combination with a hollow core having a water-passage on its periphery from one end to the other, said core having an aperture for opening up communication between said water-passage and the interior of the core at one end of the passage, and means for admitting water to said passage at the other end, means within said water-passage for electrolytically treating the water and removable means within said hollow core for filtering the water therein, and an offtake for said filtering means, substantially as shown and described.

8. The combination with a hollow core having a water-passage on its periphery from one end to the other, said core having an aperture for opening up communication between said water-passage and the interior of the core at one end of the passage, means for admitting water to said passage at the other end, means within said water-passage for electrolytically treating the water and removable means within said hollow core for filtering the water therein, an offtake for said filtering means, and a casing for the whole.

9. The combination with a hollow core having water-passages on its periphery, of electrodes held in said water-passages and spaced apart to permit the water to pass therebetween, substantially as shown and described.

10. The combination with a hollow core having water-passages on its periphery, of electrodes held in said water-passages and spaced apart to permit the water to pass therebetween, and a casing for the whole, substantially as shown and described.

11. The combination with a hollow core having water-passages on its periphery extending from one end to the other thereof, said water-passages being open on the periphery of the core, of an electrode held within the bottom of said water-passage, and a second electrode held at the periphery of said water-passage to form a closure for the peripheral opening, substantially as shown and described.

12. In combination with a hollow core having water-passages on its periphery extending from one end to the other thereof, said water-passages being open on the periphery of the core, of an electrode held within the bottom of said water-passage, a second electrode held at the periphery of said water-passage to form a closure for the peripheral opening thereof, means for admitting water into said water-passage at one end, and means for receiving the water from the water-passage at the other end, and a mechanical filtering means within said receiving means, and an offtake for said mechanical filtering means, substantially as shown and described.

13. In combination with a core having water-passages on its periphery extending from one end to the other thereof, said water-passages being open on the periphery of the core, of an electrode held within the bottom of said water-passage, a second electrode held at the periphery of said water-passage to form a closure for the peripheral opening thereof, means for admitting water into said water-passage at one end, means for receiving the water from the water-passage at the other end, a mechanical filtering means within said receiving means, an offtake for said mechanical filtering means, and an insulating-covering for the core and filtering means, substantially as shown and described.

14. In combination with a core having water-passages on its periphery extending from one end to the other thereof, said water-passages being open on the periphery of the core, of an electrode held within the bottom of said water-passage, a second electrode held on the periphery of said water-passage to form a closure for the peripheral opening thereof, means for admitting water into said water-passage at one end, means for receiving the water from the water-passage at the other end, a mechanical filtering means within said receiving means, an offtake for said mechanical filtering means, an insulating-covering for the core and filtering means, and a casing surrounding said insulating-covering.

15. In combination with a core having water-passages on its periphery extending from one end to the other thereof, said water-passages being open on the periphery of the core, of an electrode held within the bottom of said water-passage, a second electrode held at the periphery of said water-passage to form a closure for the peripheral opening thereof, means for admitting water into said water-passage at one end, means for receiving the water from the water-passage at the other end, a mechanical filtering means within said receiving means, an offtake for said mechanical filtering means, an insulating-covering for the core and filtering means, a casing surrounding said insulating-covering, said casing including closure-caps, substantially as shown and described.

16. In combination with a core having water-passages on its periphery extending from one end to the other thereof, said water-passages being open on the periphery of the core, of an electrode held within the bottom of said water-passage, a second electrode held at the periphery of said water-passage to form a closure for the peripheral opening thereof, means for admitting water into said water-passage at one end, means for receiving the water from the water-passage at the other end, a mechanical filtering means within said receiving means, an offtake for said mechanical filtering means, an insulating-covering for the core and filtering means, a casing surrounding said insulating-covering, said casing including removable closure-caps, one of said closure-caps having means for supporting said mechanical filtering means, substantially as shown and described.

ALBERT E. DIETERICH.

Witnesses:
    MAY E. IMMICH,
    IRENE A. DEITERICH.